(12) United States Patent
Hu

(10) Patent No.: US 9,347,453 B2
(45) Date of Patent: May 24, 2016

(54) METHOD FOR CONTROLLING AIR VOLUME

(71) Applicant: Zhongshan Broad-Ocean Motor Co., Ltd., Zhongshan (CN)

(72) Inventor: Ge Hu, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 702 days.

(21) Appl. No.: 13/845,139

(22) Filed: Mar. 18, 2013

(65) Prior Publication Data

US 2014/0133999 A1    May 15, 2014

(30) Foreign Application Priority Data

Nov. 13, 2012 (CN) .......................... 2012 1 0453463

(51) Int. Cl.
*F24F 11/047* (2006.01)
*F04D 27/00* (2006.01)
*F24F 11/00* (2006.01)

(52) U.S. Cl.
CPC .......... *F04D 27/004* (2013.01); *F24F 11/0079* (2013.01); *F24F 11/047* (2013.01); *Y02B 30/746* (2013.01)

(58) Field of Classification Search
CPC .. F04D 27/004; F24F 11/047; F24F 11/0079; Y02B 30/746
See application file for complete search history.

(56) References Cited

U.S. PATENT DOCUMENTS

2002/0150478 A1* 10/2002 Aoki .................. B60H 1/00457
417/44.1

* cited by examiner

*Primary Examiner* — Kenneth M Lo
*Assistant Examiner* — Fenyang Stewart
(74) *Attorney, Agent, or Firm* — Matthias Scholl, PC; Matthias Scholl

(57) ABSTRACT

A method for controlling air volume output by a motor. The method includes: 1) establishing functional relation formulas for air volume in a low torque interval and a high torque interval; 2) inputting a target air volume into a microprocessor control unit; 3) starting a motor under a torque to enable the motor to reach a steady state; 4) acquiring an adjustment coefficient under the torque, and calculating the air volume; 5) comparing the target air volume with the calculated air volume; 6) re-recording a steady rotational speed after the motor reaches a new steady state under an increased or reduced torque, and recalculating the air volume in the new steady state; and 7) repeating steps 5) and 6) to adjust the torque until the calculated air volume is equal or equivalent to the target air volume.

18 Claims, 6 Drawing Sheets

METHOD FOR CONTROLLING AIR VOLUME

CROSS-REFERENCE TO RELATED APPLICATIONS

Pursuant to 35 U.S.C. §119 and the Paris Convention Treaty, this application claims the benefit of Chinese Patent Application No. 201210453463.4 filed Nov. 13, 2012, the contents of which are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a method for controlling air volume output by a motor.

2. Description of the Related Art

In an indoor ventilation duct of a household air-conditioner, static pressure often changes because of dust deposition in a duct or blockage of a filter. The static pressure is often higher than the standard static pressure for a nominal system of a manufacturer laboratory due to different installations of ducts. Constant air volume control can provide constant air volume for users under such cases, so as to maintain the comfortable ventilating, cooling or heating effect under broad static pressure conditions.

To realize the constant air volume control, an air volume meter is installed, which, however, increases the cost and the potential risk due to failure of the air volume meter. Currently, air conditioner manufactures mostly adopt a method for controlling air volume provided to remain constant without an air volume meter.

In addition, in some technical schemes, rotational speed is adjusted by monitoring the changes of static pressure to obtain constant air volume. A typical method for determination of the air volume is to directly measure the external static pressure, which requires that the relationship between the static pressure and air volume is measured in advance, then the torque of a motor is calculated under the static pressure corresponding to the specified air volume, and speed adjustment is carried out by monitoring the changes of static pressure. Some calculation formulas involve logarithmic computation or high-order polynomials, and this requires that a microprocessor control unit (MCU) for a motor controller has stronger calculating ability, thus the cost is further improved.

As an improvement, a method for controlling constant air volume for a motor employs a first-order or second-order function to describe the system and does not require to measure a real-time static pressure; thereby simplifying the structure of the fan system and the mathematical model, furthermore, the requirement of the computing capacity of an MCU (Micro Controller Unit) for the motor controller is not high, thereby lowering the production cost. However, the method has the following defects: 1) a control accuracy of the method is relatively poor in some situations; 2) the method lacks a process for correct an individual air volume, when the overall test result is good, but accuracy problems exist in some of the operating positions. The method cannot employ compensating means to improve the accuracy of these operating positions on the premise of no affecting other operating positions.

SUMMARY OF THE INVENTION

In view of the above-described problems, it is one objective of the invention to provide by a motor. The method has high efficiency, high speed, high control accuracy, simple and convenient mathematical model for air volume calculation, and low implementation cost, and can automatically adapt the wide range of static pressure.

To achieve the above objective, in accordance with one embodiment of the invention, there is provided a method for controlling air volume output by a motor, the method comprising:

1) determining a low torque interval 0-Tm and a high torque interval Tm-T0 within a range from 0 to a rated torque T0; testing relationships between an air volume and a rotational speed of a motor system under multiple constant torques within the low torque interval and the high torque interval, respectively; establishing a functional relation formula Q1=F1 (T, n, V) for calculating the air volume within the low torque interval; and establishing a functional relation formula Q2=F2 (T, n, V) for calculating the air volume within the high torque interval; Q representing the air volume, T representing a torque, n representing the rotational speed, V representing an adjustment coefficient, and each torque section having a corresponding adjustment coefficient which is input into a microprocessor control unit of a motor controller;

2) inputting a target air volume $Q_{ref}$ into the microprocessor control unit of the motor controller;

3) starting the motor by the motor controller under the torque T to enable the motor to reach a steady state, and recording the rotational speed n in the steady state;

4) acquiring the adjustment coefficient V under the torque T through a table look-up method; determining whether the torque T is within the low torque interval or within the high torque interval; calculating an air volume Q according to the functional relation formula Q1=F1 (T, n, V) if the torque T is within the low torque interval; and calculating the air volume Q according to the functional relation formula Q2=F2 (T, n, V) if the torque T is within the high torque interval;

5) comparing the target air volume $Q_{ref}$ with the calculated air volume $Q_c$ by the microprocessor control unit of the motor controller, and a) maintaining the torque to work at the steady state and recording the rotational speed n if the target air volume $Q_{ref}$ is equal or equivalent to the calculated air volume $Q_c$; or b) increasing the torque T through the motor controller if the target air volume $Q_{ref}$ is greater than the calculated air volume $Q_c$, or c) decreasing the torque T through the microprocessor control unit of the motor controller if the target air volume $Q_{ref}$ is smaller than the calculated air volume $Q_c$;

6) re-recording a steady rotational speed after the motor reaches a new steady state under an increased or reduced torque; re-searching the corresponding adjustment coefficient V through the table look-up method; determining whether the torque in the steady state is within the low torque interval or within the high torque interval; and recalculating the air volume $Q_c$ according to the corresponding functional relation formula; and 7) repeating step 5) and step 6) to adjust the torque until the calculated air volume $Q_c$ is equal or equivalent to the target air volume $Q_{ref}$, and recording the rotational speed n in the steady state after the motor reaches the steady state.

In a class of this embodiment, step 7) is followed by step 8), that is, if the rotational speed and the output air volume change due to the alteration of an external system, the motor controller compares the new steady rotational speed with the rotational speed in step 5) or step 7) to acquire the change of output air volume, and then steps 4), 5), 6), and 7) are repeated.

In a class of this embodiment, step 7) is followed by step 9) for recording an abnormal individual air volume, that is, carrying out a practical testing and calibration, if under working conditions of a target air volume and a static pressure p, an actual air volume $Q_m$ is greatly different from the target air volume, setting an abnormal point; setting the target air volume as an abnormal target air volume $Q_t$; recording a torque T1 and a rotational speed n1 in a steady state; manually correcting the target air volume recorded in a program until the actual air volume $Q_m$ is equal to the abnormal target air volume Q; recording a manually corrected compensation target air volume $Q_p$, a torque T2, a rotational speed n2 on a new steady state; acquiring an array $\{Q_t, n1, Q_p, n2\}$ at each abnormal point, and storing the array corresponding to each abnormal point in the microprocessor control unit of the motor controller.

Step 3) is followed by step 10) for individual air volume correction: the microprocessor control unit of the motor controller making a judgment through the table look-up method; adjusting the target air volume $Q_{ref}$ if the target air volume $Q_{ref}$=the abnormal target air volume $Q_t$, the rotational speed n=the rotational speed n1, and the motor has not yet entered a flow of normally adjusting the air volume; using the manually corrected compensation target air volume $Q_p$ as a new target air volume; and repeating steps 4), 5), 6), and 7); the rotational speed in the steady state recorded in the step 7) at the moment is the rotational speed n2 mentioned in step 9); exiting the individual air volume correction if in the real-time control, the conditions of "the target air volume $Q_{ref}$=the abnormal target air volume $Q_t$, and the rotational speed n=the rotational speed n1" are not met because the status of a temperature controller is corrected by a user, or the rotational speed n is not equal to the rotation speed n2; restoring an original input target air volume $Q_{ref}$; and repeating steps 4), 5), 6), and 7).

In a class of this embodiment, a calculation formula for calculating air volume is as follows:

$$Q1 = c0 \times \sqrt{\frac{T \times V}{T_{base1}}} + c1 \times n, \text{ or}$$

$$Q1 = c0 \times \sqrt{\frac{T \times V}{T_{base1}}} + c1 \times n + c2 \times n^2 \times \sqrt{\frac{T_{base1}}{T \times V}};$$

$$Q2 = c3 \times \sqrt{\frac{T \times V}{T_{base2}}} + c4 \times n, \text{ or}$$

$$Q2 = c3 \times \sqrt{\frac{T \times V}{T_{base2}}} + c4 \times n + c5 \times n^2 \times \sqrt{\frac{T_{base2}}{T \times V}};$$

in which, coefficients c0, c1, and c2 are obtained by a curve fitting method under different external static pressure conditions of a base torque $T_{base1}$ according to original data of the rotational speed and air volume parameters; and coefficients c3, c4, and c5 are obtained by the curve fitting method under different external static pressure conditions of a base torque $T_{base2}$ according to original data of the rotational speed and air volume parameters.

In a class of this embodiment, Tm is a critical torque of the low torque interval and the high torque interval, and ranges from 30% T0 to 70% T0.

In a class of this embodiment, Tm=40% T0, the base torque of the low torque interval $T_{base1}$=20% T0, and the base torque of the high torque interval $T_{base2}$=50% T0.

In a class of this embodiment, the adjustment coefficient V changes between 0.1 and 2. Tm has two adjustment coefficient V values corresponding to the high torque interval and the low torque interval, respectively.

In a class of this embodiment, the calculated air volume $Q_c$ is equal or equivalent to the target air volume $Q_{ref}$ in step 5) and step 7) means that the calculated air volume $Q_c$ is in the range of "target air volume $Q_{ref}$ error window", and the error window of the target air volume $Q_{ref}$ ranges from 1% to 2%.

In a class of this embodiment, increasing or decreasing the torque T through the motor controller in step 5) means increasing or decreasing the torque T according to step length sequence of at least 1% $T_0$ each time, or new torque=current torque$\times(Q_{ref}/Q_c)^2$.

In a class of this embodiment, the functional relation formulas Q1=F1(T, n, V), Q2=F2(T, n, V) are acquired as follows according to original data of rotational speed and air volume parameters under a base torque $T_{base}$ and other torques and under different external static pressure: arranging the motor fixed on a wind wheel in an air-conditioning device; setting the motor to work at the working state of constant torque T0; selecting a plurality of torque values comprising the base torque within the range without exceeding a rated torque; allowing the motor to work under different torques; and changing the external static pressure of the system in sequence to collect the original data comprising the rotational speed and the air volume parameters.

Advantages of the invention are summarized as follows:
1) The motor works at states of constant torque, and a plurality of torque values comprising the base torque are selected in the range of without exceeding the rated torque, so that the motor works under different torques, the external static pressure of the system is changed in sequence for collecting the original date comprising rotational speed and air volume parameters; the low torque interval and the high torque interval are established, and the function relation formula Q1=F1 (T, n, V) for calculating the air volume within the low torque interval and the functional relation formula Q2=F2 (T, n, V) for calculating the air volume within the high torque interval are obtained according to the original data of rotational speed and air volume parameters under different external static pressure conditions of different torques. The mathematical model for calculating air volume only has a first-order or second-order function, thus the method is simple in operation, simplified in calculation high in efficiency, high in response speed, high in control accuracy, and low in implementation cost. The system is described by two function formulas corresponding to the low torque interval and high torque interval, respectively; the error of air volume is controlled in the range of 0.5%-5%, thus the method has a good application prospect.
2) The method is practicable at a wide range of static pressure, and the air volume is calculated through measuring the external static pressure of the system, so that the structure of the product is simplified, and the cost is reduced.
3) when the precision of constant air volume is verified according to the above steps, it may happen that the overall results is good, but the precision under one or several working conditions is poor, the method for individual air volume correction is conducted without affecting the obtained high precision of other operating points; that is, the actual testing and calibration is carried out. If the actual air volume $Q_m$ is greatly different from the target air volume under the working conditions of a target air volume and a static pressure p, abnormal points are set. The target air volume value recorded in the program under the working conditions is manually corrected until the actual air volume $Q_m$ is equivalent to the abnormal target air volume $Q_t$, and the manually corrected compensated target air volume $Q_p$, the torque T2 and the rotational speed n2 in the new steady state are recorded; the data of each abnormal point constitutes the array $\{Q_t, n1, Q_p, n2\}$, and the corresponding arrays of a plurality of abnormal points are stored in the micro controller unit for the motor controller. Judging is carried out in the micro controller unit for the motor controller through a table look-up method, when the target air volume $Q_{ref}$=the abnormal target air volume $Q_t$, the rotational speed n=the rotational speed n1, and the motor has not yet entered a flow of normally adjusting the air volume, the target air volume $Q_{ref}$ is adjusted, the manually corrected compensated target air volume $Q_p$ is used as a new target air volume, and the steps 4, 5, 6 and 7 are repeated; the steady rotational speed is ultimately recorded as n2; in the "individual air volume calibration" mode, if the target air volume $Q_{ref}$ is not equal to the abnormal target air volume $Q_t$, or the rotational speed n is not equal to the rotational speed n2, the individual air volume calibration is cancelled, and the control accuracy can be further enhanced through individual air volume calibration.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for controlling air volume are described below. It should be noted that the following examples are intended to describe and not to limit the invention.

Figure 1:
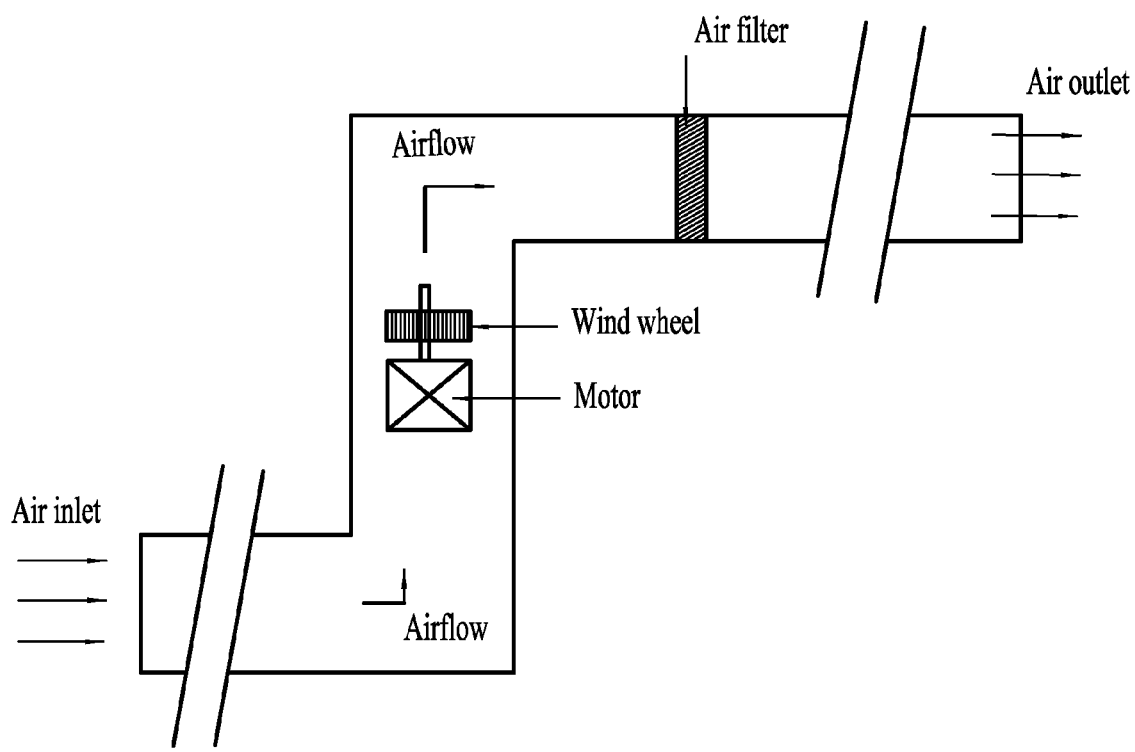
FIG. 1 is a structure diagram of a traditional air-conditioning fan system.

As shown in FIG. 1, a blower system (e.g., a gas furnace or an air processor, which are replaced with "motor+wind wheel" in the figure) is installed in a typical air-conditioning ventilation duct. An air filter is arranged in the duct. Air-blasting is started when the motor is started. The number of air outlets and air inlets is related to that of rooms, and there is no unified standard to design ducts. Meanwhile, the filter may have different pressure drops, and the blower system carrying a traditional single-phase AC motor (PSC motor) is positioned in a different duct, thus the actual air volume will be different.

Figure 2:
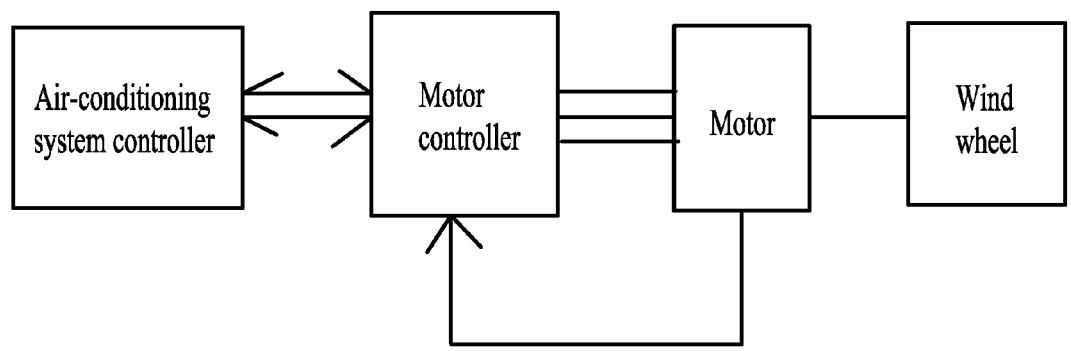
FIG. 2 is a control flowchart of an air conditioning system in accordance with one embodiment of the invention.

As shown in FIG. 2, an electronically commutated motor (ECM) is employed to drive the wind wheel to rotate, and comprises a motor controller. The motor controller is connected and communicated with an air-conditioning system controller, for example, the air-conditioning system controller sends the target air volume to the motor controller, and the motor controller controls the motor to drive the wind wheel to rotate, so as to output the target air volume, equivalently to the control of air volume.

Figure 3:
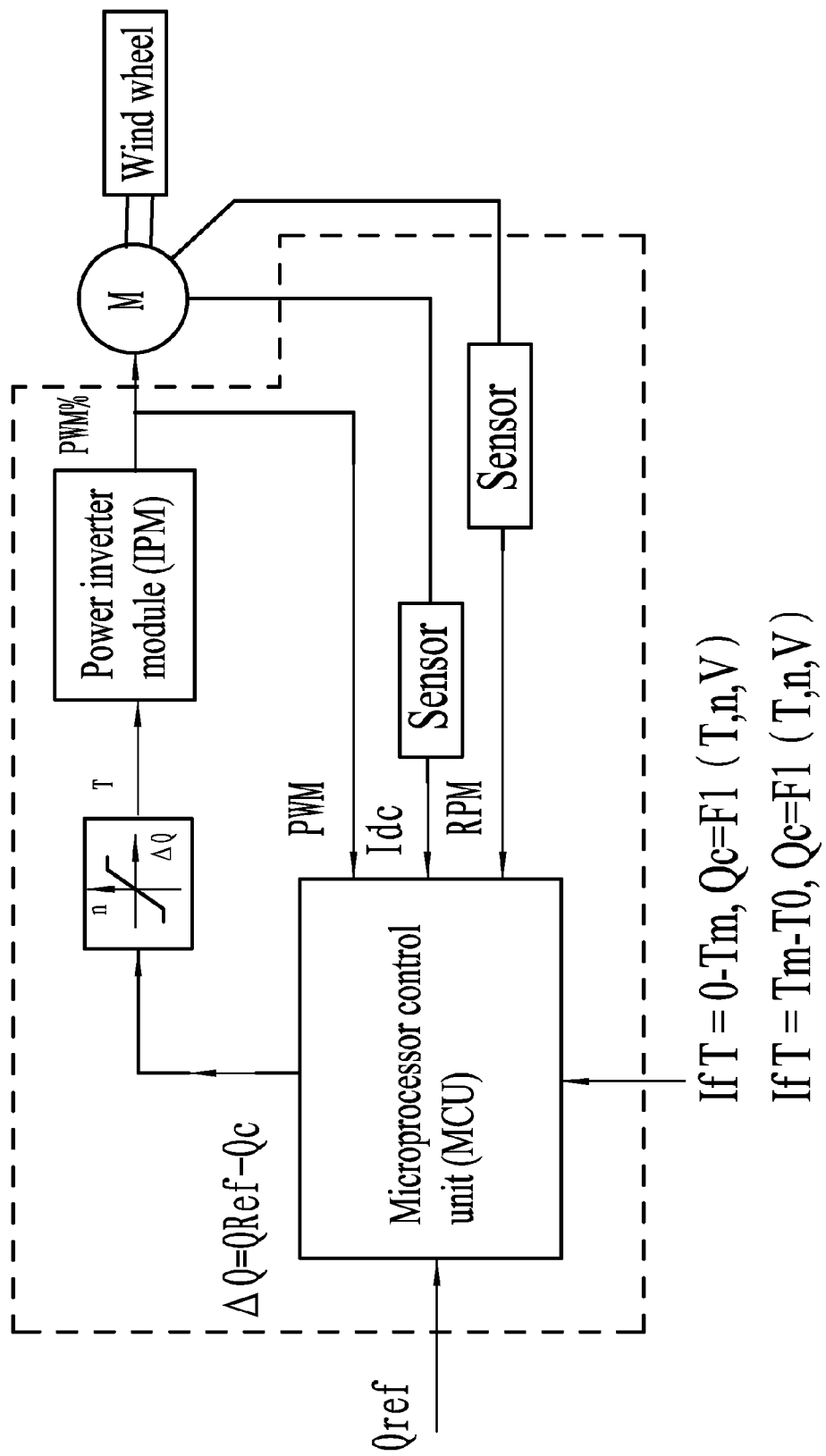
FIG. 3 is a functional block diagram of a method for controlling air volume in accordance with one embodiment of the invention.

As shown in FIG. 3, the air-conditioning system controller inputs a target air volume $Q_{ref}$ to a microprocessor control unit of the motor controller. The motor controller comprises a sensor, a microprocessor control unit, and a power inverter module. The sensor inputs a rotational speed signal RPM and a current signal $I_{dc}$ of the motor to the microprocessor control unit. A PWM (Pulse-Width Modulation) signal output by the power inverter module is also sent to the microprocessor control unit for processing. Every coefficient involved in a functional relation formula Q=F (T, n, V), comprising a comparison table for corresponding adjustment coefficients V under different working torques, is input to the microprocessor control unit of the motor controller in advance. The microprocessor control unit compares the target air volume $Q_{ref}$ with the calculated air volume Q for adjusting the output signals, and the torque is used as controlled amount for indirectly controlling air volume. If the target air volume $Q_{ref}$ is greater than the calculated air volume $Q_c$, the output torque T is increased through the motor controller; if the target air volume $Q_{ref}$ is smaller than the calculated air volume $Q_c$, the output torque T is reduced through the microprocessor control unit of the motor controller. After the motor enters a steady state, the steady rotational speed n under the increased or reduced torque is re-recorded. The motor controller is used for re-searching the corresponding adjustment coefficients V through a table look-up method. The calculated air volume $Q_c$ is recalculated, and the torque adjustment is stopped until the calculated air volume $Q_c$ is equal or equivalent to the target air volume $Q_{ref}$, and then the motor enters a steady state, i.e., the constant air volume state. The target air volume $Q_{ref}$ is a fixed value, however, in the microprocessor control unit, when the calculated air volume $Q_c$ is adjusted to the range of "target air volume $Q_{ref}$±error window", it is regarded that the requirement is met, and adjustment is stopped. The advantage is that the repeated adjustment due to small perturbations is avoided to achieve the stable air volume. The error window of the target air volume $Q_{ref}$ generally ranges from 1% to 2%.

Figure 4:
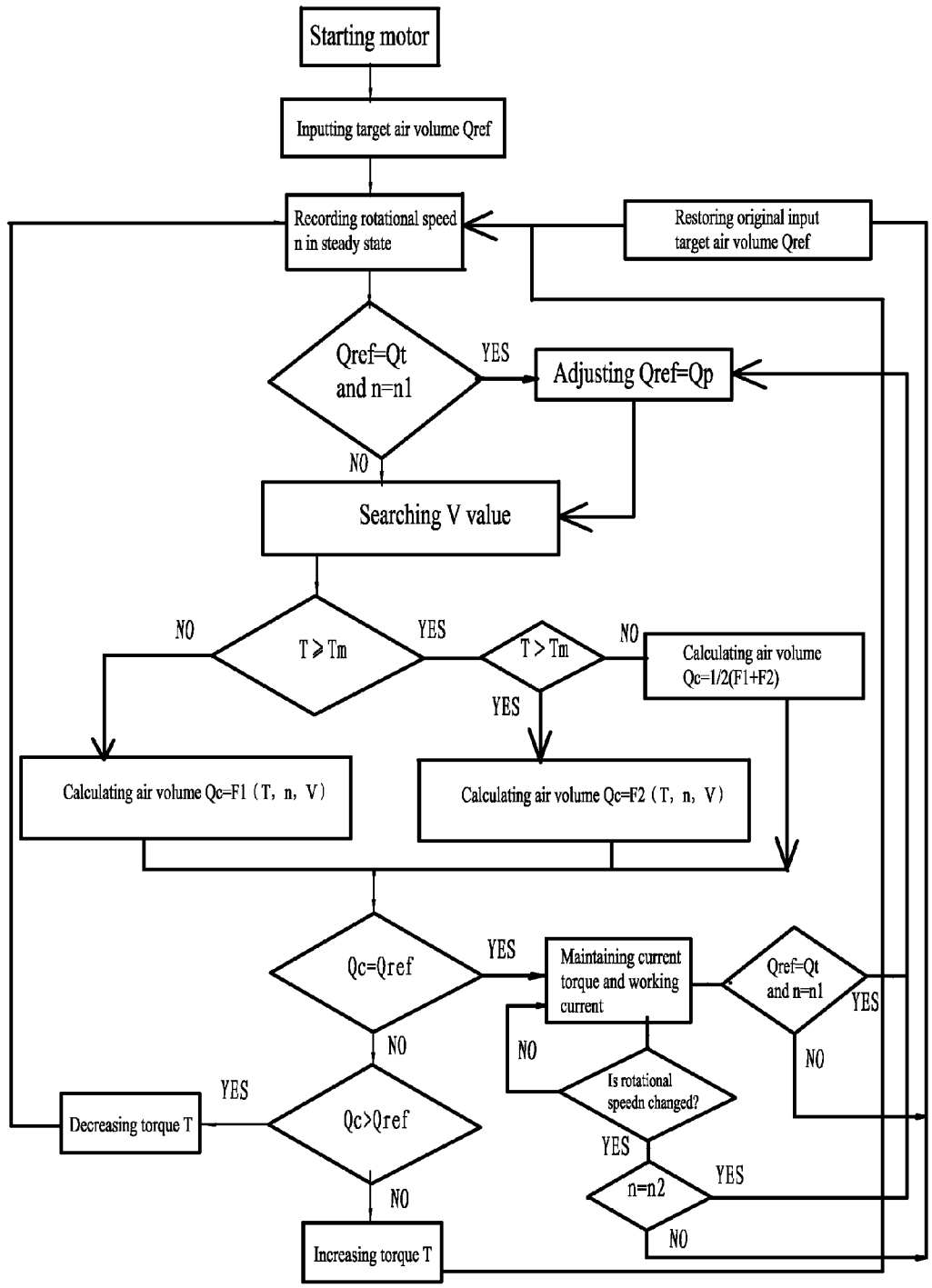
FIG. 4 is a control flowchart of a method for controlling air volume in accordance with one embodiment of the invention.

As shown in FIG. 4, a method for controlling air volume output by an air conditioning fan system, the method comprising:

1) determining a low torque interval 0-Tm and a high torque interval Tm-T0 within a range from 0 to a rated torque T0; testing relationships between an air volume and a rotational speed of a motor system under multiple constant torques within the low torque interval and the high torque interval, respectively; establishing a functional relation formula Q1=F1 (T, n, V) for calculating the air volume within the low torque interval; and establishing a functional relation formula Q2=F2 (T, n, V) for calculating the air volume within the high torque interval; Q representing the air volume, T representing a torque, n representing the rotational speed, V representing an adjustment coefficient, and each torque section having a corresponding adjustment coefficient which is input into a microprocessor control unit of a motor controller;

2) inputting a target air volume $Q_{ref}$ into the microprocessor control unit of the motor controller;

3) starting the motor by the motor controller under the torque T to enable the motor to reach a steady state, and recording the rotational speed n in the steady state;

4) acquiring the adjustment coefficient V under the torque T through a table look-up method; determining whether the torque T is within the low torque interval or within the high torque interval; calculating an air volume $Q_c$ according to the functional relation formula Q1=F1 (T, n, V) if the torque T is within the low torque interval; and calculating the air volume Q according to the functional relation formula Q2=F2 (T, n, V) if the torque T is within the high torque interval;

5) comparing the target air volume $Q_{ref}$ with the calculated air volume $Q_c$ by the microprocessor control unit of the motor controller, and a) maintaining the torque to work at the steady state and recording the rotational speed n if the target air volume $Q_{ref}$ is equal or equivalent to the calculated air volume $Q_c$; or b) increasing the torque T through the motor controller if the target air volume $Q_{ref}$ is greater than the calculated air volume $Q_c$, or c) decreasing the torque T through the microprocessor control unit of the motor controller if the target air volume $Q_{ref}$ is smaller than the calculated air volume $Q_c$;

6) re-recording a steady rotational speed after the motor reaches a new steady state under an increased or reduced torque; re-searching the corresponding adjustment coefficient V through the table look-up method; determining whether the torque in the steady state is within the low torque interval or within the high torque interval; and recalculating the air volume $Q_c$ according to the corresponding functional relation formula; and 7) repeating step 5) and step 6) to adjust the torque until the calculated air volume Q is equal or equivalent to the target air volume $Q_{ref}$, and recording the rotational speed n in the steady state after the motor reaches the steady state.

Step 7) is followed by step 8), that is, if the rotational speed and the output air volume change due to the alteration of an external system, the motor controller compares the new steady rotational speed with the rotational speed in step 5) or step 7) to acquire the change of output air volume, and then steps 4), 5), 6), and 7) are repeated.

Step 7) is followed by step 9) for recording an abnormal individual air volume, that is, carrying out a practical testing and calibration, if under working conditions of a target air volume and a static pressure p, an actual air volume $Q_m$ is greatly different from the target air volume, setting an abnormal point; setting the target air volume as an abnormal target air volume $Q_t$; recording a torque T1 and a rotational speed n1 in a steady state; manually correcting the target air volume recorded in a program until the actual air volume $Q_m$ is equal to the abnormal target air volume Q; recording a manually corrected compensation target air volume $Q_p$, a torque T2, a rotational speed n2 in a new steady state; acquiring an array $\{Q_t, n1, Q_p, n2\}$ at each abnormal point, and storing the array corresponding to each abnormal point in the microprocessor control unit of the motor controller.

Step 3) is followed by step 10) for individual air volume correction: the microprocessor control unit of the motor controller making a judgment through the table look-up method; adjusting the target air volume $Q_{ref}$ if the target air volume $Q_{ref}$=the abnormal target air volume $Q_t$, the rotational speed n=the rotational speed n1, and the motor has not yet entered a flow of normally adjusting the air volume; using the manually corrected compensation target air volume $Q_p$ as a new target air volume; and repeating steps 4), 5), 6), and 7); the rotational speed in the steady state recorded in the step 7) at the moment is the rotational speed n2 mentioned in step 9); exiting the individual air volume correction if in the real-time control, the conditions of "the target air volume $Q_{ref}$=the abnormal target air volume $Q_t$, and the rotational speed n=the rotational speed n1" are not met because the status of a temperature controller is corrected by a user, or the rotational speed n is not equal to the rotation speed n2; restoring an original input target air volume $Q_{ref}$; and repeating steps 4), 5), 6), and 7).

A calculation formula for calculating air volume is as follows:

$$Q1 = c0 \times \sqrt{\frac{T \times V}{T_{base1}}} + c1 \times n, \text{ or}$$

$$Q1 = c0 \times \sqrt{\frac{T \times V}{T_{base1}}} + c1 \times n + c2 \times n^2 \times \sqrt{\frac{T_{base1}}{T \times V}};$$

$$Q2 = c3 \times \sqrt{\frac{T \times V}{T_{base2}}} + c4 \times n, \text{ or}$$

$$Q2 = c3 \times \sqrt{\frac{T \times V}{T_{base2}}} + c4 \times n + c5 \times n^2 \times \sqrt{\frac{T_{base2}}{T \times V}};$$

in which, coefficients c0, c1, and c2 are obtained by a curve fitting method under different external static pressure conditions of a base torque $T_{base1}$ according to original data of the rotational speed and air volume parameters; and coefficients c3, c4, and c5 are obtained by the curve fitting method under different external static pressure conditions of a base torque $T_{base2}$ according to original data of the rotational speed and air volume parameters.

Tm is a critical torque of the low torque interval and the high torque interval, and ranges from 30% T0 to 70% T0.

Tm=40% T0, the base torque of the low torque interval $T_{base1}$=20% T0, and the base torque of the high torque interval $T_{base2}$=50% T0.

In a class of this embodiment, the adjustment coefficient V changes between 0.1 and 2. Tm has two adjustment coefficient V values corresponding to the high torque interval and the low torque interval, respectively.

The calculated air volume Q is equal or equivalent to the target air volume $Q_{ref}$ in step 5) and step 7) means that the calculated air volume $Q_c$ is in the range of "target air volume $Q_{ref}$ error window", and the error window of the target air volume $Q_{ref}$ ranges from 1% to 2%.

Increasing or decreasing the torque T through the motor controller in step 5) means increasing or decreasing the torque T according to step length sequence of at least 1% $T_0$ each time, or new torque=current torque×$(Q_{ref}/Q_c)^2$.

The functional relation formulas Q1=F1(T, n, V), Q2=F2 (T, n, V) are acquired as follows according to original data of rotational speed and air volume parameters under a base torque $T_{base}$ and other torques and under different external static pressure: arranging the motor fixed on a wind wheel in an air-conditioning device; setting the motor to work at the working state of constant torque T0; selecting a plurality of torque values comprising the base torque within the range without exceeding a rated torque; allowing the motor to work under different torques; and changing the external static pressure of the system in sequence to collect the original data comprising the rotational speed and the air volume parameters.

The following are the derivation process of the functional relation formulas (Q1=F1 (T, n, V), and Q2=F2 (T, n, V)), and the fan law states that under certain conditions, the air volume is proportional to the rotational speed, that is, $$\frac{Q_1}{Q_2} = \frac{n_1}{n_2};$$

the external air pressure of the fan is proportional to the square of the rotational speed, that is, $$\frac{P_1}{P_2} = \left(\frac{n_1}{n_2}\right)^2;$$

and the output torque of the motor, i.e., the input torque of the fan, is proportional to the square of the rotational speed, that is, $$\frac{T_1}{T_2} = \left(\frac{n_1}{n_2}\right)^2 = \left(\frac{Q_1}{Q_2}\right)^2;$$

n represents the rotational speed of the motor, Q represents air volume, P represents the external air pressure rise of the fan, and T represents the output torque of the motor, i.e., the input torque of the fan.

For convenient derivation, the relation formula between the air volume and rotational speed is as follows:

$$Q_{equiv} = c0 + c1 \times n_{equiv},$$

or (if the quadratic polynomial is used)

$$Q_{equiv} = c0 + c1 \times n_{equiv} + c2 \times n_{equiv}^2.$$

From the formula above, by combining the law for the fan, the relationship between the rotational speed and air volume can be further derived under an arbitrary torque. To do this, it is needed to derive how the equivalent air volume $Q_{equiv}$ and equivalent rotational speed $n_{equiv}$ are converted into a new torque under the torque ($T=T_{base1}$) according to the law for the fan:

$$Q_{equiv} = Q \times \sqrt{\frac{T_{base1}}{T}}$$

$$n_{equiv} = n \times \sqrt{\frac{T_{base1}}{T}}.$$

If the linear relation formula is used, then $$Q1 = Q_{equiv} \times \sqrt{\frac{T}{T_{base1}}} =$$

$$\left(c0 + c1 \times n \times \sqrt{\frac{T}{T_{base1}}}\right) \times \sqrt{\frac{T}{T_{base1}}} = c0 \times \sqrt{\frac{T}{T_{base1}}} + c1 \times n.$$

If the quadratic polynomial is used, then $$Q1 = Q_{equiv} \times \sqrt{\frac{T}{T_{base1}}}$$

$$= \left(c0 + c1 \times n \times \sqrt{\frac{T_{base1}}{T}} + c2 \times n^2 \times \frac{T_{base1}}{T}\right) \times \sqrt{\frac{T}{T_{base1}}}$$

$$= c0 \times \sqrt{\frac{T}{T_{base1}}} + c1 \times n + c2 \times n^2 \times \sqrt{\frac{T_{base1}}{T}}.$$

From the experimental results, the device for testing air volume is always used for dynamically regulating back pressure for controlling the external static pressure, or a method for controlling the size of an air outlet is adopted for controlling the external static pressure, and it causes that the fan law is invalid in the whole range of air volume, thus an adjustment coefficient V is required to be added in the formula above. The formula after adjustment is as follows.

If the linear relation formula is used, then $$Q1 = c0 \times \sqrt{\frac{T \times V}{T_{base1}}} + c1 \times n.$$

If the quadratic polynomial is used, then $$Q1 = c0 \times \sqrt{\frac{T \times V}{T_{base1}}} + c1 \times n + c2 \times n^2 \times \sqrt{\frac{T_{base1}}{T \times V}}.$$

Similarly, in the high torque interval, we need to derive the functional relation formula for calculating the air volume under the condition ($T=T_{base2}$).

If the linear relation formula is used, then $$Q2 = c3 \times \sqrt{\frac{T \times V}{T_{base2}}} + c4 \times n.$$

If the quadratic polynomial is used, then $$Q2 = c3 \times \sqrt{\frac{T \times V}{T_{base2}}} + c4 \times n + c5 \times n^2 \times \sqrt{\frac{T_{base2}}{T \times V}}.$$

The adjustment coefficient V value is changed between 0.1 and 2, the selecting principle is that the air volume value calculated from the formula above is equal or similar to the actual test value, the coefficients c0, c1 and c2 are obtained through a curve fitting method according to the original data of parameters of the rotational speed and air volume under the base torque $T_{base1}$ in different external static pressures, the coefficients c3, c4 and c5 are obtained through a curve fitting method according to the original data of parameters of the rotational speed and air volume under the base torque $T_{base2}$ in different external static pressures.

EXAMPLE 1

The Data is a ½HP Motor Carried with a Load

It's assumed that the air volume is calculated with the functional relation formula $$Q1 = c0 \times \sqrt{\frac{T \times V}{T_{base1}}} + c1 \times n$$

in the low torque interval or calculated with the functional relation formula $$Q2 = c3 \times \sqrt{\frac{T \times V}{T_{base2}}} + c4 \times n$$

in the high torque interval, T0=3.390 Nm (i.e., in the range of 40 oz-ft), Tm=1.356 Nm=40% T0, the torque in the high torque interval ranges from 1.356 Nm to 3.390 Nm, and the torque in the low torque interval ranges from 0 Nm to 1.356 Nm. The base torque $T_{base1}$ in the low torque interval is 20% T0 (0.678 Nm), and the base torque $T_{base2}$ in the high torque interval is 50% T0 (1.695 Nm).

Figure 5:
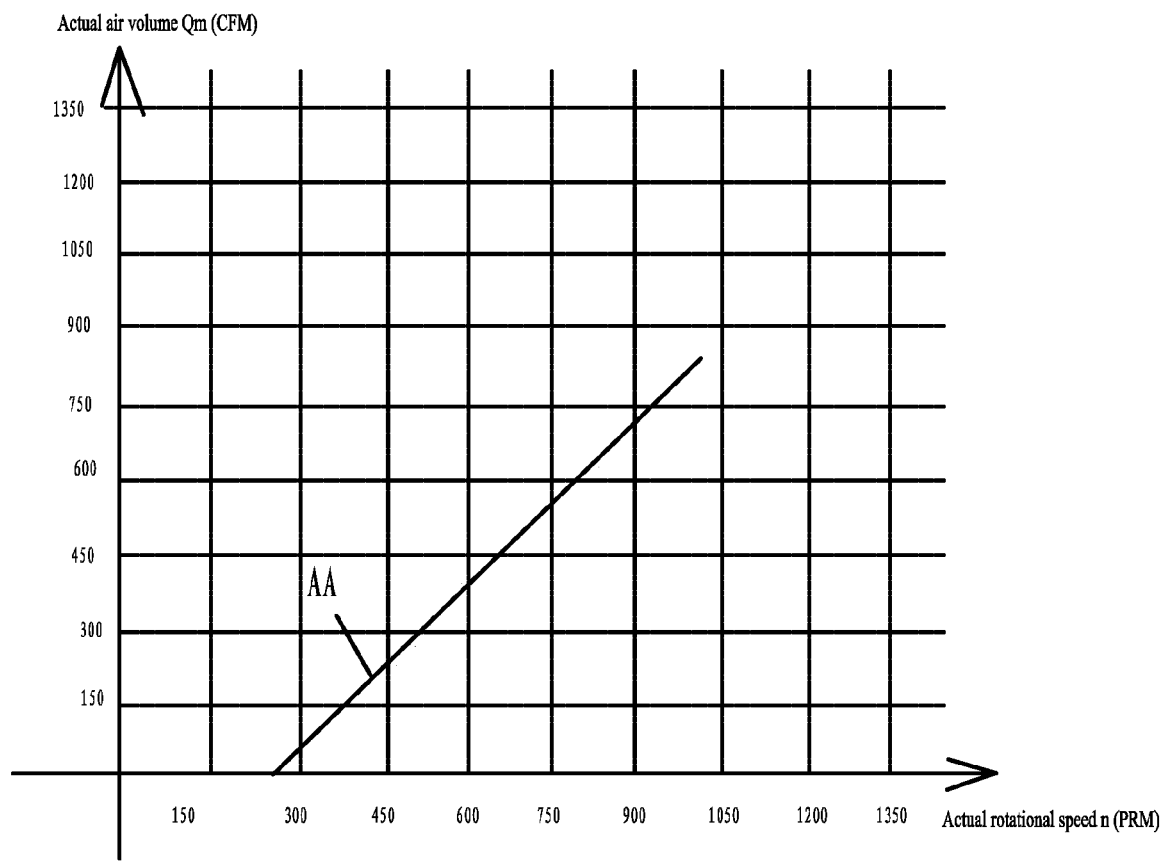
FIG. 5 is a straight line fitting diagram of measured data within a low torque interval in accordance with one embodiment of the invention.

When the low torque interval is 0-40% T0, the concrete data of the actual rotational speed n (PRM) and the actual air volume $Q_m$ (CFM) is obtained by experimentally measuring data, and marked with points plotted in the figure, then the straight line is fitted, as shown in FIG. 5, c1 is equal to the slope of the straight line AA, $$c0 \times \sqrt{\frac{T \times V}{T_{base1}}}$$

is equal to the value of intersection point between the straight line AA and the horizontal axis. When T=$T_{base1}$=20% T0, and V=1, the value of c0 can be calculated; or the coefficient c0 and other coefficients can be calculated through a least square method, and the formula for calculating air volume and the values of c0 and c1 are preliminarily obtained. As shown in Table 1,

TABLE 1

| T = 10% T0, V = 1.40 | | | |
|---|---|---|---|
| External static pressure P ("H$_2$O") | Actual air volume $Q_m$ (CMF) | Actual rotational speed (RPM) | Calculated air volume $Q_c$ (CFM) |
| 0.2 | 646 | 617.8 | 655 |
| 0.3 | 571 | 738.93 | 573 |
| 0.4 | 525 | 809 | 526 |
| 0.5 | 490 | 865.87 | 487 | when T=10% T0, the actual rotational speed n (PRM) and the actual air volume $Q_m$ (CFM) in different external static pressures are obtained, and the actual rotational speed n (PRM) and the actual air volume $Q_m$ (CFM) are substituted into the above calculation formula, and the V value is adjusted until the calculated air volume is basically equal to the actually measured air volume.

The V value corresponding to different torques in the low torque interval can be calculated through the above methods, and see Table 2 for the V values in the low torque interval; the V value table is stored in the motor controller.

TABLE 2

| Torque T | 10% T0 | ... | 20% T0 | ... | 30% T0 | ... | 40% T0 |
|---|---|---|---|---|---|---|---|
| V value | 1.40 | ... | 1 | ... | 0.87 | ... | 0.81 |

Figure 6:
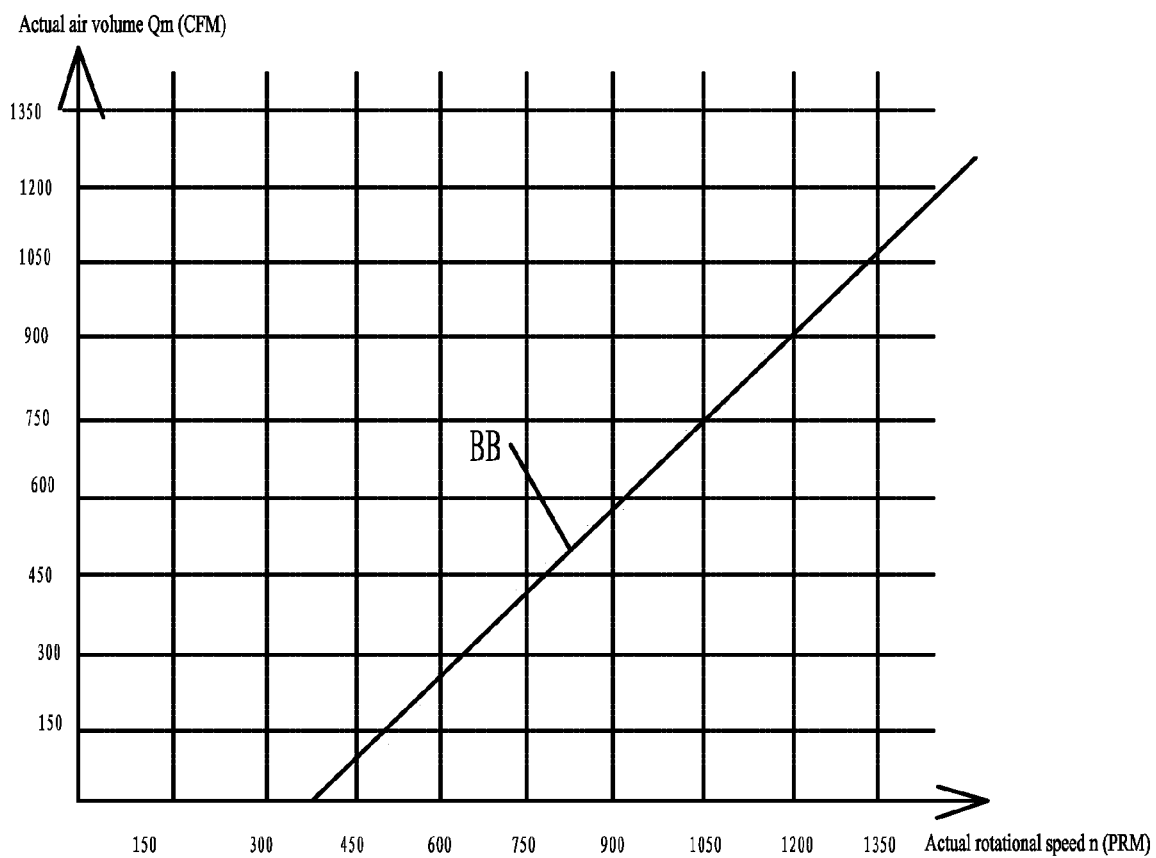
FIG. 6 is a straight line fitting diagram of measured data within a high torque interval in accordance with one embodiment of the invention.

When the high torque interval is 40% T0-100% T0, the concrete data of the actual rotational speed n (PRM) and the actual air volume $Q_m$ (CFM) is obtained by experimentally measuring data, and marked with points plotted in the figure, then the straight line is fitted, as shown in FIG. 6, c4 is equal to the slope of the straight line BB, $$c3 \times \sqrt{\frac{T \times V}{T_{base2}}}$$

is equal to the value of intersection point between the straight line BB and the horizontal axis, and when T=$T_{base2}$=50% T0, and V=1, the value of c3 can be calculated; the formula for calculating air volume and the values of c4 and c3 are preliminarily obtained, or the coefficient c0 and other coefficients can be calculated through a least square method. As shown in Table 3, when T=60% T0, the actual rotational speed n (PRM) and the actual air volume $Q_m$ (CFM) in different external static pressures are obtained, and the actual rotational speed n (PRM) and the actual air volume $Q_m$ (CFM) are substituted into the above calculation formula, and the V value is adjusted until the calculated air volume is basically equal to the actually measured air volume.

TABLE 3

| T = 60% T0, V = 0.97 | | | |
|---|---|---|---|
| External static pressure P ("H$_2$O") | Actual air volume $Q_m$ (CMF) | Actual rotational speed (RPM) | Calculated air volume $Q_c$ (CFM) |
| 0.7 | 1188 | 1117.27 | 1167 |
| 0.8 | 1065 | 1221 | 1071 |
| 0.9 | 1010 | 1259.53 | 1035 |
| 1 | 983 | 1312.4 | 985 |

The V value corresponding to different torques in the high torque interval can be calculated through the above methods, and see Table 4 for the V values in the high torque interval; the V value table is stored in the motor controller.

TABLE 4

| Torque T | 40% T0 | 50% T0 | 60% T0 | 70% T0 | 80% T0 | 90% T0 | 100% T0 |
|---|---|---|---|---|---|---|---|
| V value | 1.07 | 1 | 0.97 | 0.91 | 0.89 | 0.87 | 0.83 |

In summary, we can establish the functional relation formula (Q1=F1(T, n, V)) for calculating air volume in the low torque interval, as well as the functional relation formula (Q2=F2(T, n, V)) for calculating air volume in the high torque interval; in which, Q represents air volume, T represents torque, n represents rotational speed, V represents adjustment coefficient, a corresponding adjustment coefficient V is provided for each torque section, the V value between every two torque sections is obtained through linear interpolation and input into the micro controller unit for the motor controller, and then the operation can be executed according to the process shown in FIG. 4. When the critical torque Tm has two corresponding V values, two calculation formulas for high and low torque can be used for calculating the air volume, and then an average is taken. For calculation, the following formula: Q=½ (Q1+Q2) is used.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for controlling air volume output by a motor, the method comprising:
   1) determining a low torque interval 0-Tm and a high torque interval Tm-T0 within a range from 0 to a rated torque T0; testing relationships between an air volume and a rotational speed of a motor system under multiple constant torques within the low torque interval and the high torque interval, respectively; establishing a functional relation formula Q1=F1 (T, n, V) for calculating the air volume within the low torque interval; and establishing a functional relation formula Q2=F2 (T, n, V) for calculating the air volume within the high torque interval; Q representing the air volume, T representing a torque, n representing the rotational speed, V representing an adjustment coefficient, and each torque section having a corresponding adjustment coefficient which is input into a microprocessor control unit of a motor controller;
   2) inputting a target air volume $Q_{ref}$ into the microprocessor control unit of the motor controller;
   3) starting the motor by the motor controller under the torque T to enable the motor to reach a steady state, and recording the rotational speed n in the steady state;
   4) acquiring the adjustment coefficient V under the torque T through a table look-up method; determining whether the torque T is within the low torque interval or within the high torque interval; calculating an air volume $Q_c$ according to the functional relation formula Q1=F1 (T, n, V) if the torque T is within the low torque interval; and calculating the air volume $Q_c$ according to the functional relation formula Q2=F2 (T, n, V) if the torque T is within the high torque interval;
   5) comparing the target air volume $Q_{ref}$ with the calculated air volume $Q_c$ by the microprocessor control unit of the motor controller, and a) maintaining the torque to work at the steady state and recording the rotational speed n if the target air volume $Q_{ref}$ is equal or equivalent to the calculated air volume $Q_c$; or b) increasing the torque T through the motor controller if the target air volume $Q_{ref}$ is greater than the calculated air volume $Q_c$, or c) decreasing the torque T through the microprocessor control unit of the motor controller if the target air volume $Q_{ref}$ is smaller than the calculated air volume $Q_c$;
   6) re-recording a steady rotational speed after the motor reaches a new steady state under an increased or reduced torque; re-searching the corresponding adjustment coefficient V through the table look-up method; determining whether the torque in the steady state is within the low torque interval or within the high torque interval; and recalculating the air volume $Q_c$ according to the corresponding functional relation formula; and
   7) repeating step 5) and step 6) to adjust the torque until the calculated air volume $Q_c$ is equal or equivalent to the target air volume $Q_{ref}$, and recording the rotational speed n in the steady state after the motor reaches the steady state.

2. The method of claim 1, wherein step 7) is followed by step 8): if the rotational speed and the output air volume change due to the alteration of an external system, the motor controller compares the new steady rotational speed with the rotational speed in step 5) or step 7) to acquire the change of output air volume, and then steps 4), 5), 6), and 7) are repeated.

3. The method of claim 1, wherein
   step 7) is followed by step 9) for recording an abnormal individual air volume: carrying out a practical testing and calibration, if under working conditions of a target air volume and a static pressure p, an actual air volume $Q_m$ is greatly different from the target air volume, setting an abnormal point; setting the target air volume as an abnormal target air volume $Q_t$; recording a torque T1 and a rotational speed n1 in a steady state; manually correcting the target air volume recorded in a program until the actual air volume $Q_m$ is equivalent to the abnormal target air volume Q; recording a manually corrected compensation target air volume $Q_p$, a torque T2, a rotational speed n2 in a new steady state; acquiring an array $\{Q_t, n1, Q_p, n2\}$ at each abnormal point, and storing the array corresponding to each abnormal point in the microprocessor control unit of the motor controller; and
   step 3) is followed by step 10) for individual air volume correction: the microprocessor control unit of the motor controller making a judgment through the table look-up method; adjusting the target air volume $Q_{ref}$ if the target air volume $Q_{ref}$=the abnormal target air volume $Q_t$, the rotational speed n=the rotational speed n1, and the motor has not yet entered a flow of normally adjusting the air volume; using the manually corrected compensation target air volume $Q_p$, as a new target air volume; and repeating steps 4), 5), 6), and 7); the rotational speed in the steady state recorded in the step 7) at the moment is the rotational speed n2 mentioned in step 9); exiting the individual air volume correction if in the real-time control, the conditions of "the target air volume $Q_{ref}$=the abnormal target air volume $Q_t$, and the rotational speed n=the rotational speed n1" are not met because the status of a temperature controller is corrected by a user, or the rotational speed n is not equal to the rotation speed n2; restoring an original input target air volume $Q_{ref}$; and repeating steps 4), 5), 6), and 7).

4. The method of claim 2, wherein
   step 7) is followed by step 9) for recording an abnormal individual air volume: carrying out a practical testing and calibration, if under working conditions of a target air volume and a static pressure p, an actual air volume $Q_m$ is greatly different from the target air volume, setting an abnormal point; setting the target air volume as an abnormal target air volume $Q_t$; recording a torque T1 and a rotational speed n1 in a steady state; manually correcting the target air volume recorded in a program until the actual air volume $Q_m$ is equivalent to the abnormal target air volume Q; recording a manually corrected compensation target air volume $Q_p$, a torque T2, a rotational speed n2 in a new steady state; acquiring an array $\{Q_t,$ n1, $Q_p$, n2} at each abnormal point, and storing the array corresponding to each abnormal point in the microprocessor control unit of the motor controller; and step 3) is followed by step 10) for individual air volume correction: the microprocessor control unit of the motor controller making a judgment through the table look-up method; adjusting the target air volume $Q_{ref}$ if the target air volume $Q_{ref}$=the abnormal target air volume $Q_t$, the rotational speed n=the rotational speed n1, and the motor has not yet entered a flow of normally adjusting the air volume; using the manually corrected compensation target air volume $Q_p$, as a new target air volume; and repeating steps 4), 5), 6), and 7); the rotational speed in the steady state recorded in the step 7) at the moment is the rotational speed n2 mentioned in step 9); exiting the individual air volume correction if in the real-time control, the conditions of "the target air volume $Q_{ref}$=the abnormal target air volume $Q_t$, and the rotational speed n=the rotational speed n1" are not met because the status of a temperature controller is corrected by a user, or the rotational speed n is not equal to the rotation speed n2; restoring an original input target air volume $Q_{ref}$; and repeating steps 4), 5), 6), and 7).

5. The method of claim 1, wherein a calculation formula for calculating air volume is as follows:

$$Q1 = c0 \times \sqrt{\frac{T \times V}{T_{base1}}} + c1 \times n,$$

or $$Q1 = c0 \times \sqrt{\frac{T \times V}{T_{base1}}} + c1 \times n + c2 \times n^2 \times \sqrt{\frac{T_{base1}}{T \times V}};$$

$$Q2 = c3 \times \sqrt{\frac{T \times V}{T_{base2}}} + c4 \times n,$$

or $$Q2 = c3 \times \sqrt{\frac{T \times V}{T_{base2}}} + c4 \times n + c5 \times n^2 \times \sqrt{\frac{T_{base2}}{T \times V}};$$

in which, coefficients c0, c1, and c2 are obtained by a curve fitting method under different external static pressure conditions of a base torque $T_{base1}$ according to original data of the rotational speed and air volume parameters; and coefficients c3, c4, and c5 are obtained by the curve fitting method under different external static pressure conditions of a base torque $T_{base2}$ according to original data of the rotational speed and air volume parameters.

6. The method of claim 4, wherein a calculation formula for calculating air volume is as follows:

$$Q1 = c0 \times \sqrt{\frac{T \times V}{T_{base1}}} + c1 \times n,$$

or $$Q1 = c0 \times \sqrt{\frac{T \times V}{T_{base1}}} + c1 \times n + c2 \times n^2 \times \sqrt{\frac{T_{base1}}{T \times V}};$$

$$Q2 = c3 \times \sqrt{\frac{T \times V}{T_{base2}}} + c4 \times n,$$

or $$Q2 = c3 \times \sqrt{\frac{T \times V}{T_{base2}}} + c4 \times n + c5 \times n^2 \times \sqrt{\frac{T_{base2}}{T \times V}};$$

in which, coefficients c0, c1, and c2 are obtained by a curve fitting method under different external static pressure conditions of a base torque $T_{base1}$ according to original data of the rotational speed and air volume parameters; and coefficients c3, c4, and c5 are obtained by the curve fitting method under different external static pressure conditions of a base torque $T_{base2}$ according to original data of the rotational speed and air volume parameters.

7. The method of claim 1, wherein Tm is a critical torque of the low torque interval and the high torque interval, and ranges from 30% T0 to 70% T0.

8. The method of claim 4, wherein Tm is a critical torque of the low torque interval and the high torque interval, and ranges from 30% T0 to 70% T0.

9. The method of claim 7, wherein Tm=40% T0, the base torque of the low torque interval $T_{base1}$=20% T0, and the base torque of the high torque interval $T_{base2}$=50% T0.

10. The method of claim 8, wherein Tm=40% T0, the base torque of the low torque interval $T_{base1}$=20% T0, and the base torque of the high torque interval $T_{base2}$=50% T0.

11. The method of claim 9, wherein
the adjustment coefficient V changes between 0.1 and 2; and
Tm has two adjustment coefficient V values corresponding to the high torque interval and the low torque interval, respectively.

12. The method of claim 10, wherein
the adjustment coefficient V changes between 0.1 and 2; and
Tm has two adjustment coefficient V values corresponding to the high torque interval and the low torque interval, respectively.

13. The method of claim 11, wherein the calculated air volume $Q_c$ is equal or equivalent to the target air volume $Q_{ref}$ in step 5) and step 7) means that the calculated air volume $Q_c$ is in the range of "target air volume $Q_{ref}$ error window", and the error window of the target air volume $Q_{ref}$ ranges from 1% to 2%.

14. The method of claim 12, wherein the calculated air volume $Q_c$ is equal or equivalent to the target air volume $Q_{ref}$ in step 5) and step 7) means that the calculated air volume $Q_c$ is in the range of "target air volume $Q_{ref}$ error window", and the error window of the target air volume $Q_{ref}$ ranges from 1% to 2%.

15. The method of claim 1, wherein increasing or decreasing the torque T through the motor controller in step 5) means increasing or decreasing the torque T according to step length sequence of at least 1% $T_0$ each time, or new torque=current torque$\times(Q_{ref}/Q_c)^2$.

16. The method of claim 4, wherein increasing or decreasing the torque T through the motor controller in step 5) means increasing or decreasing the torque T according to step length sequence of at least 1% $T_0$ each time, or new torque=current torque$\times(Q_{ref}/Q_c)^2$.

17. The method of claim 1, wherein the functional relation formulas Q1=F1(T, n, V), Q2=F2(T, n, V) are acquired as follows according to original data of rotational speed and air volume parameters under a base torque $T_{base}$ and other torques and under different external static pressure:

a) arranging the motor fixed on a wind wheel in an air-conditioning device;
b) setting the motor to work at the working state of constant torque T0;
c) selecting a plurality of torque values comprising the base torque within the range without exceeding a rated torque;
d) allowing the motor to work under different torques; and
e) changing the external static pressure of the system in sequence to collect the original data comprising the rotational speed and the air volume parameters.

18. The method of claim 4, wherein the functional relation formulas Q1=F1(T, n, V), Q2=F2(T, n, V) are acquired as follows according to original data of rotational speed and air volume parameters under a base torque $T_{base}$ and other torques and under different external static pressure:
a) arranging the motor fixed on a wind wheel in an air-conditioning device;
b) setting the motor to work at the working state of constant torque T0;
c) selecting a plurality of torque values comprising the base torque within the range without exceeding a rated torque;
d) allowing the motor to work under different torques; and
e) changing the external static pressure of the system in sequence to collect the original data comprising the rotational speed and the air volume parameters.

\* \* \* \* \*